(12) United States Patent
Lykkegaard

(10) Patent No.: US 11,505,407 B2
(45) Date of Patent: Nov. 22, 2022

(54) STORAGE AND RETRIEVAL SYSTEM

(71) Applicant: BEUMER Group A/S, Aarhus (DK)

(72) Inventor: Uffe Lykkegaard, Aarhus (DK)

(73) Assignee: Beumer Group A/S, Aarhus N (DK)

( * ) Notice: Subject to any disclaimer, the term of this patent is extended or adjusted under 35 U.S.C. 154(b) by 346 days.

(21) Appl. No.: 16/311,368

(22) PCT Filed: Dec. 16, 2016

(86) PCT No.: PCT/DK2016/050439
§ 371 (c)(1),
(2) Date: Dec. 19, 2018

(87) PCT Pub. No.: WO2018/001423
PCT Pub. Date: Jan. 4, 2018

(65) Prior Publication Data
US 2019/0322453 A1    Oct. 24, 2019

(30) Foreign Application Priority Data

Jun. 28, 2016  (DK) .......................... PA 2016 70461

(51) Int. Cl.
*B65G 1/137*    (2006.01)
(52) U.S. Cl.
CPC ........ *B65G 1/1375* (2013.01); *B65G 2201/02* (2013.01)
(58) Field of Classification Search
CPC combination set(s) only.
See application file for complete search history.

(56) References Cited

U.S. PATENT DOCUMENTS 5,564,879 A    10/1996 Noguchi
7,261,509 B2    8/2007 Freudelsperger
(Continued)

FOREIGN PATENT DOCUMENTS

CN    101140470 A    3/2008
CN    201109617 Y    9/2008
(Continued)

OTHER PUBLICATIONS

English abstract for JPS6417707 from Espacement Euoprean Patent Office dated Dec. 18, 2018 (p. 6).
(Continued)

*Primary Examiner* — Kyle O Logan
(74) *Attorney, Agent, or Firm* — Woodard, Emhardt, Henry, Reeves & Wagner, LLP

(57) ABSTRACT

There is disclosed agiotage and retrieval system e.g. suitable for use in an airport and for aircraft baggage. In order e.g. to provide such system which improves usage and availability in view of the prior-art, a control system controls the system in two modes of operation. In a first mode of operation, a first rack region serving device (110) is only serving a first rack region 104 using a first feeding and extraction conveyor system (114), and a second rack region serving device (112) is only serving a second rack region (106) using a second feeding and extraction conveyor system (116). In a second mode of operation, only the first rack region serving device (110) is used for serving both the first and second rack regions (104, 106), and only the first feeding and extraction conveyor system (114) is used for feeding articles to the first rack region serving device (110) and for taking away articles from the first rack region serving device (110).

20 Claims, 3 Drawing Sheets

(56) References Cited

U.S. PATENT DOCUMENTS

| | | | |
|---|---|---|---|
| 7,561,254 | B2 | 7/2009 | Koide |
| 8,827,619 | B2 | 9/2014 | Schafer |
| 2002/0062167 | A1 | 5/2002 | Dimitri |
| 2003/0226744 | A1* | 12/2003 | Lykkegaard ......... B65G 17/123 198/800 |
| 2004/0197171 | A1 | 10/2004 | Freudelsperger |
| 2005/0053450 | A1* | 3/2005 | Kantola ................ B66F 9/07 414/273 |
| 2005/0113965 | A1 | 5/2005 | Ngo |
| 2014/0271063 | A1 | 9/2014 | Lert |
| 2014/0356111 | A1* | 12/2014 | Lykkegaard ........... B65G 67/04 414/398 |

FOREIGN PATENT DOCUMENTS

| | | |
|---|---|---|
| CN | 100460296 C | 2/2009 |
| CN | 101670933 A | 3/2010 |
| CN | 105620995 A | 6/2016 |
| DE | 10 2011 108 269 A1 | 1/2013 |
| EP | 1 512 661 A1 | 3/2005 |
| EP | 1 726 540 A1 | 11/2006 |
| EP | 1 728 738 A1 | 12/2006 |
| EP | 1 741 644 A1 | 1/2007 |
| EP | 1 443 002 B1 | 8/2007 |
| EP | 2 019 797 B1 | 11/2011 |
| EP | 1 638 867 B2 | 12/2011 |
| EP | 2 428 465 A1 | 3/2012 |
| EP | 2 428 466 A1 | 3/2012 |
| EP | 2 428 467 A1 | 3/2012 |
| EP | 2 364 933 B1 | 12/2012 |
| EP | 2 636 615 A1 | 9/2013 |
| EP | 2 485 970 B1 | 3/2014 |
| JP | 6417707 A | 1/1989 |
| JP | 2001130708 A2 | 5/2001 |
| JP | 2003095411 A2 | 4/2003 |
| JP | 2004277167 A2 | 10/2004 |
| JP | 2006248690 A2 | 9/2006 |
| JP | 2007246259 A2 | 9/2007 |
| JP | 2015009952 A2 | 1/2015 |
| WO | WO 2012/087137 A1 | 6/2012 |
| WO | WO 2013/180563 A2 | 12/2013 |
| WO | WO 2014/204300 A1 | 12/2014 |
| WO | WO 2015/060050 A1 | 4/2015 |
| WO | WO 2016/126242 A1 | 8/2015 |

OTHER PUBLICATIONS

International Search Report and Written Opinion issued by WIPO in related PCT/DK2016/050439 dated Mar. 31, 2017 (p. 10).
Machine translation of DE102011108269A1 by Patent Translate European Patent Office on Dec. 18, 2018 (p. 33).
Chinese Office Action issued in related CN2016800872182 dated Jun. 3, 2020.
Machine translation of CN100460296C by PatBase on Aug. 31, 2020.
Machine translation of CN101670933A by PatBase on Aug. 31, 2020.
Machine translation of CN105620995A by PatBase on Aug. 31, 2020.
Machine translation of CN201109617Y by PatBase on Aug. 31, 2020.
Machine translation of JP2001130708A2 by PatBase on Aug. 31, 2020.
Machine translation of JP2003095411A2 by PatBase on Aug. 31, 2020.
Machine translation of JP2004277167A2 by PatBase on Aug. 31, 2020.
Machine translation of JP2006248690A2 by PatBase on Aug. 31, 2020.
Machine translation of JP2007246259A2 by PatBase on Aug. 31, 2020.
Machine translation of JP2015009952A2 by PatBase on Aug. 31, 2020.
Machine translation of WO2015060050A1 by PatBase on Aug. 31, 2020.

* cited by examiner

STORAGE AND RETRIEVAL SYSTEM

FIELD OF THE INVENTION

The invention relates to a storage and retrieval system and in particular to a storage and retrieval system for use in an airport for aircraft baggage.

BACKGROUND OF THE INVENTION

Automated airport baggage distribution and storage systems are used for distribution and storage of airport baggage at airports. Such systems are among others used to sort, transport and store baggage going in or out of the airport.

Typically, new, as well as existing, systems experience disadvantages related to their capacity, availability, cost and/or transit time and/or an average transport and/or retrieval period for a given baggage article. In particular, for new and existing solutions, improving one of these factors often has a too high and non-beneficial impact on one or more of the other factors.

Thus, it has been appreciated that an improved storage and retrieval system and an improved method for storing and retrieving articles, are of benefit, and in consequence the present invention has been devised.

SUMMARY OF THE INVENTION

It may be seen as an object of the present invention to provide an improved storage and retrieval system, and an improved method of storing and retrieving articles. Preferably, the invention alleviates, mitigates or eliminates one or more of the above or other disadvantages singly or in any combination.

In particular, it may be seen as an object of the invention to provide such system and method which improves usage and availability in view of the known art in a simple manner.

Accordingly, in a first aspect of the invention, there is provided a storage and retrieval system comprising:
- a plurality of racks, each of said racks arranged for storing articles next to and above each other,
- the plurality of racks is divided into at least two rack regions, a first rack region and a second rack region, where a boundary between the first rack region and the second rack region is vertical or substantially vertical,
- a bottom rail extending in a longitudinal direction along the first rack region and the second rack region,
- a first rack region serving device arranged to travel along the bottom rail, and arranged to insert articles to the first rack region and arranged to retrieve articles from the first rack region,
- a second rack region serving device arranged to travel along the bottom rail, and arranged to insert articles to the second rack region and arranged to retrieve articles from the second rack region,
- a first feeding and extraction conveyor system for feeding articles to the first rack serving device and for taking away articles from the first rack serving device,
- a second feeding and extraction conveyor system for feeding articles to the second rack serving device and for taking away articles from the second rack serving device, and where the storage and retrieval system further comprises:
- a control system for controlling the storage and retrieval system so that,
  in a first mode of operation:
  - the first rack region serving device is only serving the first rack region using the first feeding and extraction conveyor system,
  - the second rack region serving device is only serving the second rack region using the second feeding and extraction conveyor system, and
  in a second mode of operation:
  - only the first rack region serving device is used for serving both the first rack region and the second rack region, and
  - only the first feeding and extraction conveyor system is used for feeding articles to the first rack region serving device and for taking away articles from the first rack region serving device.

Thus, an improved storage and retrieval system is provided. The improvement may be seen to be provided when the storage and retrieval system is provided and operated as disclosed herein.

It is an insight, which is hereby disclosed, that when operating the storage and retrieval system in the first and second modes as disclosed, a system with an improved usage and availability is provided when compared to known systems and operation thereof. Specifically, it is an insight that a particular simple and efficient system can be provided when the first and second rack region serving devices are both used efficiently for their dedicated purpose in the first mode of operation, whereas in the second mode of operation, both rack regions are available with the use of only one of the rack region serving devices.

In an embodiment of the invention, the control system is adapted to use the second mode of operation in situations when the second rack region serving device and/or the second feeding and extraction conveyor system is having maintenance carried out. Additionally or alternatively, the second mode of operation can be used when the second rack region serving device and/or the second feeding and extraction conveyor system is at least partly having a malfunction. Hereby usage and availability of the system and its various parts is improved in comparison with known systems in a simple, but yet effective, manner.

The first rack region serving device and the second rack region serving device are arranged to move vertically, each using a separate vertically extending rail.

In embodiments of the invention, the first rack region serving device and the second rack region serving device are provided with separate data communication systems. However, according to embodiments of the invention, the data communication systems are redundant so that in case of malfunction of the data communication system of e.g. the second rack region serving device, the data communication system of the first rack region serving device is e.g. able to receive and use communication intended for the second rack region serving device.

In embodiments of the invention, the first rack region serving device and the second rack region serving device are provided with separate electrical power supply systems. However, according to embodiments of the invention, the electrical power supply systems for the first and second rack region serving devices are redundant, so that in case of malfunction of one of the electrical power supply systems, the electrical power supply system for the other rack region serving device can be used along the complete length of the bottom rail.

According to a second aspect of the invention there is provided a method of storing and retrieving articles for a storage and retrieval system, the storage and retrieval system comprising a plurality of racks, each of said racks arranged for storing articles next to and above each other, the plurality of racks is divided into at least two rack regions, a first rack region and a second rack region, where a boundary between the first rack region and the second rack region is vertical or substantially vertical, a bottom rail extending in a longitudinal direction along the first rack region and the second rack region, a first rack region serving device arranged to travel along the bottom rail, and arranged to insert articles to the first rack region and arranged to retrieve articles from the first rack region, a second rack region serving device arranged to travel along the bottom rail, and arranged to insert articles to the second rack region and arranged to retrieve articles from the second rack region, a first feeding and extraction conveyor system for feeding articles to the first rack serving device and for taking away articles from the first rack serving device, a second feeding and extraction conveyor system for feeding articles to the second rack serving device and for taking away articles from the second rack serving device, and where the storage and retrieval system further comprises:

a control system for controlling the storage and retrieval system, and where the method comprises:

operating the storage and retrieval system in two modes of operation, a first and a second mode of operation so that, in a first mode of operation:

the first rack region serving device is only serving the first rack region using the first feeding and extraction conveyor system, the second rack region serving device is only serving the second rack region using the second feeding and extraction conveyor system, and in a second mode of operation:

only the first rack region serving device is used for serving both the first rack region and the second rack region, and only the first feeding and extraction conveyor system is used for feeding articles to the first rack region serving device and for taking away articles from the first rack region serving device.

Thus, an improved method of storing and retrieving articles is provided.

According to an embodiment of the second aspect of the invention, the second mode of operation is used in situations when the second rack region serving device and/or the second feeding and extraction conveyor system is having maintenance carried out, and/or when the second rack region serving device and/or the second feeding and extraction conveyor system is at least partly having a malfunction.

According to an embodiment of the invention, the second rack region serving device is moved all the way to one side in the longitudinal direction of the bottom rail prior to the second mode of operation.

The system and method disclosed herein is particularly suited for use where maximum usage and availability of the system is of utmost importance, such as in an airport and/or where the articles comprise airport baggage.

It is to be understood that the advantages and elaboration thereof for the system as disclosed herein, can be used for the method as disclosed herein and vice versa.

By referring to an advantage herein, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the figures, in which.

DESCRIPTION OF EMBODIMENTS

Figure 1:
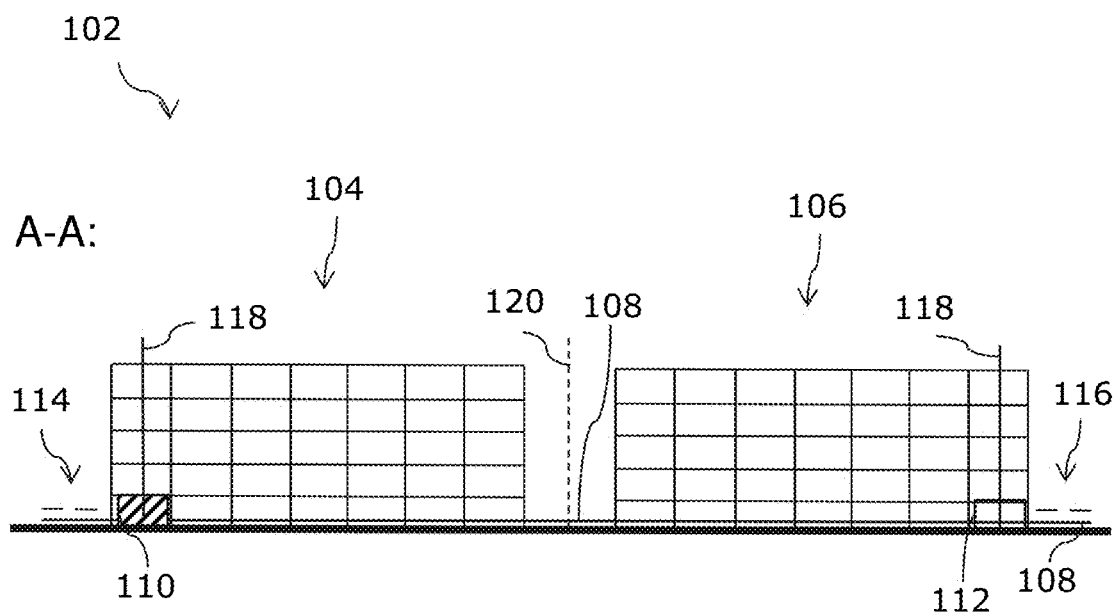
FIG. 1 illustrates a side view of a storage and retrieval system according to the invention.

FIG. 1 illustrates a side view of a storage and retrieval system 102 according to the invention. The storage and retrieval system 102 includes a plurality of racks, arranged for storing articles next to and above each other. The articles may be items placed on a carrier, pallet, tote or similar, or the articles may just be the items themselves. As is seen, the plurality of racks is divided into two rack regions 104, 106, a first rack region 104 and a second rack region 106. There is also illustrated a boundary 120 between the first rack region and the second rack region is vertical or substantially vertical. The vertical direction can be referred to as a Y-direction. A bottom rail 108 extends in a longitudinal direction along the first rack region and the second rack region, such longitudinal direction can be referred to as an X-direction. The boundary 120 can be at least one physical boundary and/or at least one boundary implemented in software in a control system for controlling the storage and retrieval system 102.

It is illustrated that the storage and retrieval system 102 includes a first rack region serving device 110, arranged to travel along and using the bottom rail 108, and arranged to insert articles to the first rack region 104 and arranged to retrieve articles from the first rack region. Likewise, the storage and retrieval system 102 includes a second rack region serving device 112, arranged to travel along and using the bottom rail 108, and arranged to insert articles to the second rack region 106 and arranged to retrieve articles from the second rack region 106. An insertion and extraction direction of articles from the rack region serving devices to and from the rack region, is in a direction into and out of the rack regions as indicated with the two-way arrows 122. Such direction can be referred to as a Z-direction. The X, Y and Z directions are perpendicular or substantially perpendicular to each other.

As illustrated, the storage and retrieval system 102 includes a first feeding and extraction conveyor system 114 for feeding articles to the first rack serving device 110, and for taking away articles from the first rack serving device 110, as well as a second feeding and extraction conveyor system 116 for feeding articles to the second rack serving device 112, and for taking away articles from the second rack serving device 112. As illustrated, feeding and extraction conveyor systems 114 and 116 can each operate bidirectionally. In addition, feeding and extraction conveyor systems 114 and 116 are each oriented perpendicular to bottom rail 108.

Figure 2:
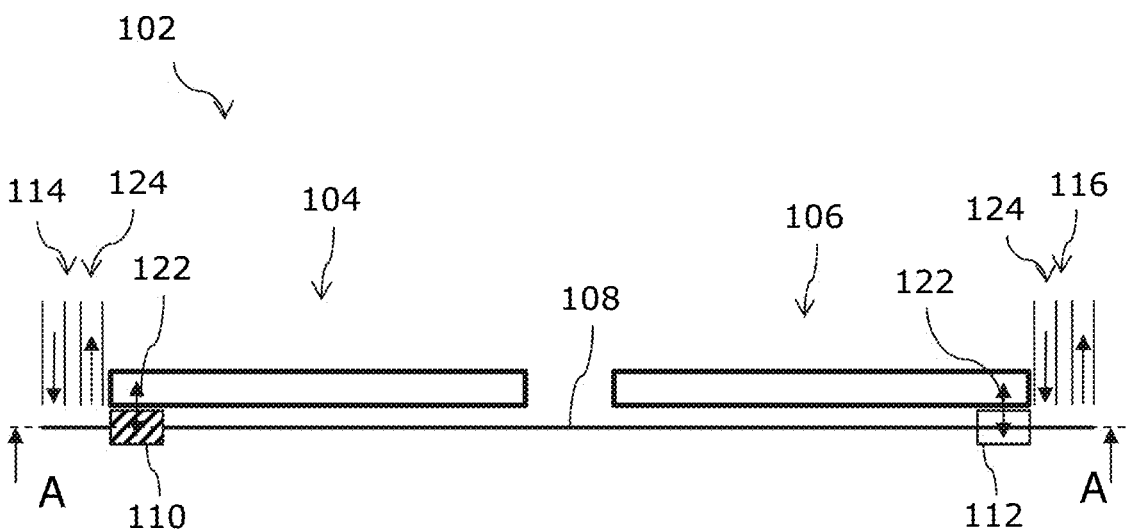
FIG. 2 illustrates a top view of the storage and retrieval system according to the invention.

FIG. 2 illustrates a top view of the storage and retrieval system 102 according to the invention. The side view in FIG. 1 is seen in the direction indicated with A-A in FIG. 2. It is illustrated with arrows 124 how the feeding and extraction conveyor systems 114, 116 are provided for feeding articles into the system and for extraction of articles out of the system.

In the illustrations of FIGS. 1 and 2, a control system for controlling the storage and retrieval system 102, controls the storage and retrieval system in a first mode of operation. In the first mode of operation, the first rack region serving device 110 is only serving the first rack region 104 using the first feeding and extraction conveyor system 114, and the second rack region serving device 112 is only serving the second rack region 106 using the second feeding and extraction conveyor system 116.

Figure 3:
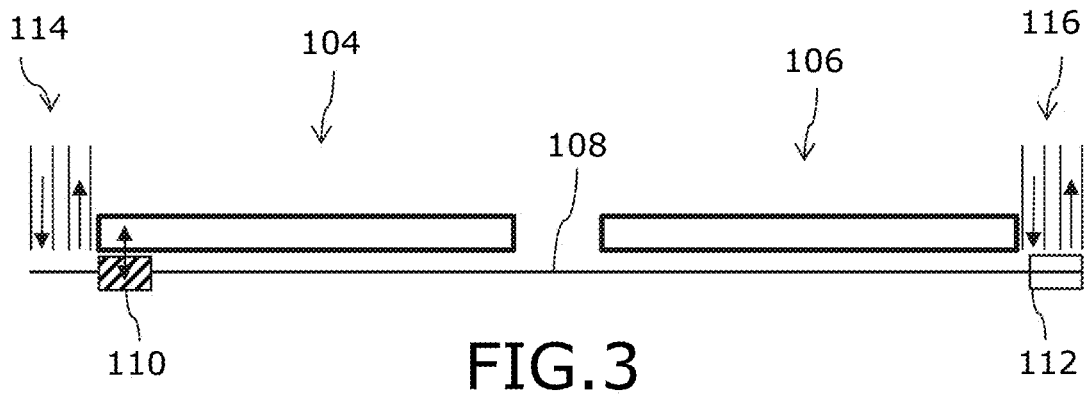
FIGS. 3-5 illustrate top views of the storage and retrieval system according to the invention in various situations.

FIG. 3 illustrates a top view of the storage and retrieval system according to the invention, where the second rack region serving device 112 is moved all the way to one side in the longitudinal direction (X-direction) of the bottom rail 108 prior to the second mode of operation.

Figure 4:
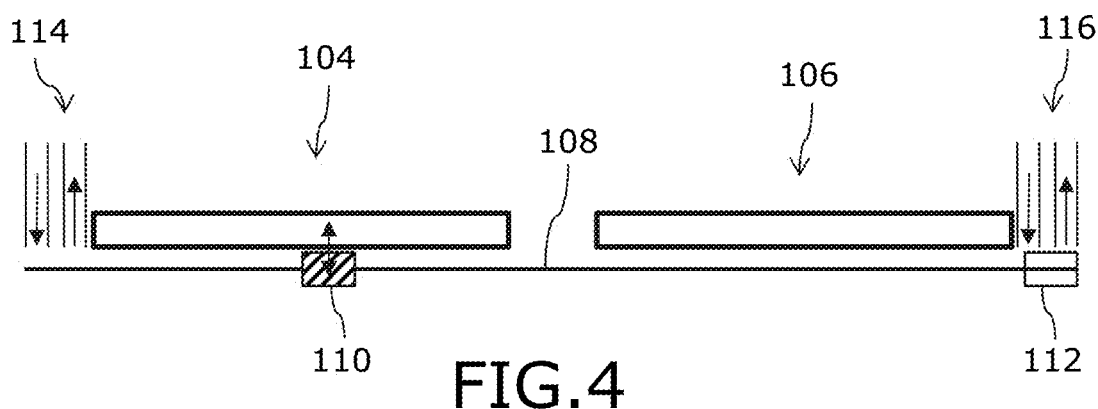
Figure 5:
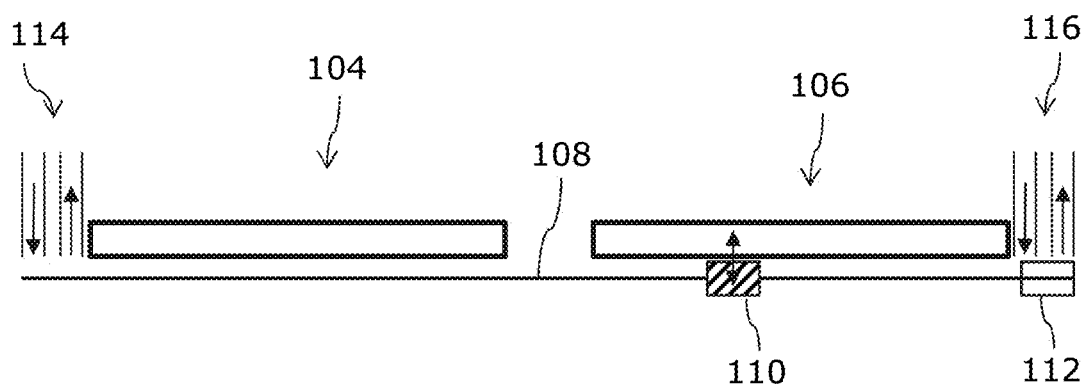

FIGS. 4 and 5 illustrate top views of the storage and retrieval system according to the invention, where the control system for controlling the storage and retrieval system controls the system in a second mode of operation. In the second mode of operation, only the first rack region serving device 110 is used for serving both the first rack region 104 and the second rack region 106, and only the first feeding and extraction conveyor system 114 is used for feeding articles to the first rack region serving device 110 and for taking away articles from the first rack region serving device 110. Thus, in FIGS. 4 and 5 there is in effect no boundary between the first and second rack regions. It is understood that the storage and retrieval system may include as many aisles as needed, and e.g. that the length of the aisle and/or the height of the racks can be provided as needed.

Figure 6:
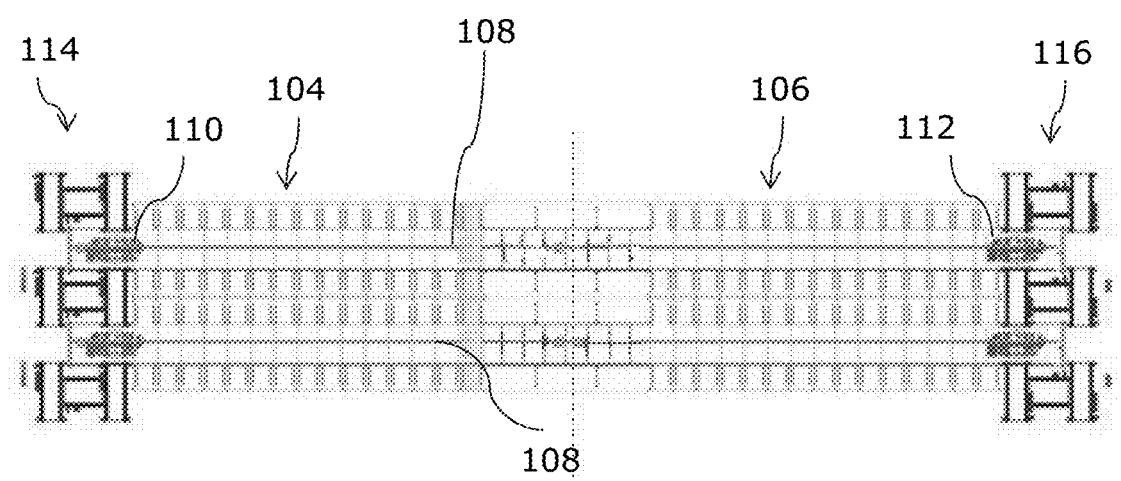
FIG. 6 shows a top view of the storage and retrieval system according to the invention.

FIG. 6 shows a top view of the storage and retrieval system according to the invention in somewhat further detail. It follows that the shown system includes two aisles with each a longitudinal bottom rail 108, where each aisle comprises racks on both sides of the aisle, and two rack regions and two rack region serving devices. In the shown embodiment, each rack region serving device is able to insert articles to racks on opposite sides of an aisle and is also able to extract articles from racks on opposite sides of an aisle.

In short, there is herein disclosed a storage and retrieval system which is e.g. suitable for use in an airport and for aircraft baggage. In order e.g. to provide such system which improves usage and availability in view of the known art, a control system controls the system in two modes of operation. In a first mode of operation, a first rack region serving device 110 is only serving a first rack region 104 using a first feeding and extraction conveyor system 114, and a second rack region serving device is only serving a second rack region 106 using a second feeding and extraction conveyor system 116. In a second mode of operation, only the first rack region serving device 110 is used for serving both the first and second rack regions 104, 106, and only the first feeding and extraction conveyor system 114 is used for feeding articles to the first rack region serving device 110 and for taking away articles from the first rack region serving device 110.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A storage and retrieval system comprising:
a plurality of racks, each of said racks arranged for storing articles next to and above each other,
the plurality of racks is divided into at least two rack regions, a first rack region and a second rack region,
a physical boundary positioned between the first rack region and the second rack region, wherein the physical boundary is vertical or substantially vertical,
one bottom rail extending in a longitudinal direction along the first rack region and the second rack region,
a first rack region serving device arranged to travel along the bottom rail, and arranged to insert articles to the first rack region and arranged to retrieve articles from the first rack region,
a second rack region serving device arranged to travel along the bottom rail, and arranged to insert articles to the second rack region and arranged to retrieve articles from the second rack region,
a first feeding and extraction conveyor system for feeding articles to the first rack serving device and for taking away articles from the first rack serving device,
a second feeding and extraction conveyor system for feeding articles to the second rack serving device and for taking away articles from the second rack serving device, and where the storage and retrieval system further comprises:
a control system for controlling the storage and retrieval system so that, in a first mode of operation:
the first rack region serving device is only serving the first rack region using the first feeding and extraction conveyor system,
the second rack region serving device is only serving the second rack region using the second feeding and extraction conveyor system, and in a second mode of operation:
the physical boundary between the first rack region and the second rack region is removed, only the first rack region serving device is used for serving both the first rack region and the second rack region, and only the first feeding and extraction conveyor system is used for feeding articles to the first rack region serving device and for taking away articles from the first rack region serving device.

2. The storage and retrieval system according to claim 1, wherein the control system is adapted to use the second mode of operation in situations when the second rack region serving device or the second feeding and extraction conveyor system is having maintenance carried out, or when the second rack region serving device or the second feeding and extraction conveyor system is at least partly having a malfunction.

3. The storage and retrieval system according to claim 1, wherein the first rack region serving device and the second rack region serving device are arranged to move vertically, each using a separate vertically extending rail.

4. The storage and retrieval system according to claim 1, wherein the first rack region serving device and the second rack region serving device are provided with separate data communication systems.

5. The storage and retrieval system according to claim 1, wherein the first rack region serving device and the second rack region serving device are provided with separate electrical power supply systems.

6. The storage and retrieval system according to claim 1, wherein the first feeding and extraction conveyor system and the second feeding and extraction conveyor system are provided with separate electrical power supply systems.

7. The storage and retrieval system of claim 1, wherein the first rack region serving device is arranged to insert articles to the second rack region and arranged to retrieve articles from the second rack region and wherein the second rack region is arranged to insert articles to the first rack region and arranged to retrieve articles from the first rack region.

8. The storage and retrieval system of claim 1, wherein the first and second feeding and extraction conveyor systems are bi-directional.

9. The storage and retrieval system of claim 1, wherein a transport direction of the first feeding and extraction conveyor system is perpendicular to the bottom rail.

10. A method of storing and retrieving articles for a storage and retrieval system, the storage and retrieval system comprising:

a plurality of racks, each of said racks arranged for storing articles next to and above each other, the plurality of racks is divided into at least two rack regions, a first rack region and a second rack region, a physical boundary positioned between the first rack region and the second rack region, wherein the physical boundary is vertical or substantially vertical, one bottom rail extending in a longitudinal direction along the first rack region and the second rack region, a first rack region serving device arranged to travel along the bottom rail, and arranged to insert articles to the first rack region and arranged to retrieve articles from the first rack region, a second rack region serving device arranged to travel along the bottom rail, and arranged to insert articles to the second rack region and arranged to retrieve articles from the second rack region, a first feeding and extraction conveyor system for feeding articles to the first rack serving device and for taking away articles from the first rack serving device, a second feeding and extraction conveyor system for feeding articles to the second rack serving device and for taking away articles from the second rack serving device, and where the storage and retrieval system further comprises:

a control system for controlling the storage and retrieval system, and where the method comprises:

selecting a mode of operation from a first mode of operation and a second mode of operation, in the first mode of operation:

serving the first rack region using only the first rack region serving device and the first feeding and extraction conveyor system, serving the second rack region using only the second rack region serving device and the second feeding and extraction conveyor system, and in the second mode of operation:

removing the physical boundary between the first rack region and the second rack region, serving both the first rack region and the second rack region using only the first rack region serving device, and feeding articles to the first rack region serving device and taking away articles from the first rack region serving device using only the first feeding and extraction conveyor system, operating the storage and retrieval system in the selected mode of operation.

11. The method according to claim 10, further comprising selecting the second mode of operation in situations when the second rack region serving device is having maintenance carried out.

12. The method according to claim 10, further comprising moving the second rack region serving device all the way to one side in the longitudinal direction of the bottom rail prior to operating the storage and retrieval system in the second mode of operation.

13. Use of a storage and retrieval system according to claim 1, where the articles comprise airport baggage.

14. The method according to claim 10, further comprising selecting the second mode of operation in situations when the second feeding and extraction conveyor system is having maintenance carried out.

15. The method according to claim 10, further comprising selecting the second mode of operation in situations when the second rack region service device is at least partly having a malfunction.

16. The method according to claim 10, further comprising selecting the second mode of operation in situations when the second feeding and extraction conveyor system is having maintenance carried out.

17. The method according to claim 10, further comprising selecting the second mode of operation in situations when the second feeding and extraction conveyor system is at least partly having a malfunction.

18. The method of claim 10, wherein the first rack region serving device is arranged to insert articles to the second rack region and arranged to retrieve articles from the second rack region and wherein the second rack region is arranged to insert articles to the first rack region and arranged to retrieve articles from the first rack region.

19. The method of claim 10, wherein the first and second feeding and extraction conveyor systems are bi-directional.

20. The method of claim 10, wherein a transport direction of the first feeding and extraction conveyor system is perpendicular to the bottom rail.

* * * * *

UNITED STATES PATENT AND TRADEMARK OFFICE
CERTIFICATE OF CORRECTION

PATENT NO. : 11,505,407 B2  
APPLICATION NO. : 16/311368  
DATED : November 22, 2022  
INVENTOR(S) : Uffe Lykkegaard Page 1 of 1

It is certified that error appears in the above-identified patent and that said Letters Patent is hereby corrected as shown below:

On the Title Page

Item [57], replace "agiotage" with --a storage--.

Signed and Sealed this  
Twenty-seventh Day of June, 2023

Katherine Kelly Vidal  
*Director of the United States Patent and Trademark Office*